(12) United States Patent
Yoo

(10) Patent No.: US 7,527,510 B2
(45) Date of Patent: May 5, 2009

(54) POWER CONNECTION APPARATUS OF DIRECT TYPE BACKLIGHT UNIT

(75) Inventor: Hee-Jong Yoo, Gimhae (KR)

(73) Assignee: Heesung Electronics Co., Ltd. (KR)

( * ) Notice: Subject to any disclaimer, the term of this patent is extended or adjusted under 35 U.S.C. 154(b) by 0 days.

(21) Appl. No.: 12/058,074

(22) Filed: Mar. 28, 2008

(65) Prior Publication Data

US 2009/0011631 A1    Jan. 8, 2009

(30) Foreign Application Priority Data

| Jul. 2, 2007 | (KR) | ............. 10-2007-0066114 |
| Oct. 11, 2007 | (KR) | ............. 10-2007-0102434 |
| Dec. 14, 2007 | (KR) | ............. 10-2007-0130751 |

(51) Int. Cl.
   *H01R 33/02* (2006.01)
(52) U.S. Cl. ............... 439/232; 439/239; 439/263
(58) Field of Classification Search ........... 439/232, 439/239, 263, 346
   See application file for complete search history.

(56) References Cited

U.S. PATENT DOCUMENTS

| 5,197,187 | A | * | 3/1993 | Thomas | ............. 29/863 |
| 5,209,668 | A | * | 5/1993 | Higano et al. | ............. 439/57 |
| 5,438,484 | A | * | 8/1995 | Kanda et al. | ............. 362/613 |
| 5,664,873 | A | * | 9/1997 | Kanda et al. | ............. 362/97 |
| 6,068,381 | A | * | 5/2000 | Ayres | ............. 362/633 |
| 6,250,970 | B1 | * | 6/2001 | Key et al. | ............. 439/699.2 |
| 6,467,942 | B2 | * | 10/2002 | Alloway et al. | ............. 362/549 |
| 7,014,510 | B2 | * | 3/2006 | Powers et al. | ............. 439/699.2 |
| 7,284,895 | B2 | * | 10/2007 | Goto | ............. 362/645 |
| 2003/0068929 | A1 | * | 4/2003 | Powers et al. | ............. 439/699.2 |
| 2004/0132336 | A1 | * | 7/2004 | Powers et al. | ............. 439/541 |
| 2006/0187682 | A1 | * | 8/2006 | Goto | ............. 362/652 |
| 2006/0279957 | A1 | * | 12/2006 | Kwon et al. | ............. 362/378 |
| 2007/0298662 | A1 | * | 12/2007 | Kim | ............. 439/620.02 |
| 2008/0009170 | A1 | * | 1/2008 | Kato et al. | ............. 439/347 |
| 2008/0080182 | A1 | * | 4/2008 | Yang et al. | ............. 362/249 |
| 2008/0102711 | A1 | * | 5/2008 | Yang et al. | ............. 439/660 |
| 2008/0106900 | A1 | * | 5/2008 | Chang et al. | ............. 362/249 |
| 2008/0119092 | A1 | * | 5/2008 | Naito et al. | ............. 439/873 |
| 2008/0139008 | A1 | * | 6/2008 | Lee et al. | ............. 439/58 |
| 2008/0143915 | A1 | * | 6/2008 | Takata et al. | ............. 349/58 |
| 2008/0146060 | A1 | * | 6/2008 | Kato et al. | ............. 439/171 |
| 2008/0207063 | A1 | * | 8/2008 | Handa et al. | ............. 439/856 |
| 2008/0211986 | A1 | * | 9/2008 | Bae et al. | ............. 349/60 |

\* cited by examiner

*Primary Examiner*—Tulsidas C Patel
*Assistant Examiner*—Vladimir Imas
(74) *Attorney, Agent, or Firm*—Keusey, Tutunjian & Bitetto, P.C.

(57) ABSTRACT

Provided is a single integral power connection apparatus of a backlight unit with a pressure cam that compresses a lamp lead receiver including plate springs using an elastic restoring force of a cam spring such that the lamp lead receiver comes in contact with a lead of a CCFL to supply power to the CCFL. The power connection apparatus includes a base disposed on a substrate of the backlight unit, the lamp lead receiver having a space defined for receiving the lead by a pair of the bent plate springs disposed on the base, a lamp lead guide disposed on the base for supporting the lead of the lamp, a lamp tube guide disposed on the base for supporting a tube of the lamp, the elastic cam spring applying the restoring force, and the pressure cam for pressing the lamp lead receiver using the restoring force of the cam spring.

17 Claims, 16 Drawing Sheets

POWER CONNECTION APPARATUS OF DIRECT TYPE BACKLIGHT UNIT

BACKGROUND OF THE INVENTION

1. Field of the Invention

The present invention relates to a power connection apparatus of a backlight unit for supplying power to a Cold Cathode Fluorescent Lamp (CCFL), and more particularly, to a single integral power connection apparatus with a pressure cam that compresses a lamp lead receiver including plate springs using an elastic restoring force of a cam spring such that the lamp lead receiver comes in contact with a lead of a lamp.

2. Description of the Related Art

Backlight units use various light sources including a Light Emitting Diode (LED) device, Electro Luminescence (EL) device, and cylindrical fluorescent lamps such as a Cold Cathode Fluorescent Lamp (CCFL), a Hot Cathode Fluorescent Lamp (HCFL), and an External Electrode Fluorescent Lamp (EEFL). According to the type of a backlight unit, one of the light sources is selected. For example, the CCFL is typically used for a direct type backlight unit that is used in a large-sized display device requiring high brightness.

A typical CCFL includes a glass tube, an inert gas, a luminescent substance, inner electrodes, and conductive contact leads. The glass tube is filled with the inert gas such as mercury (Hg) gas, argon (Ar) gas, or neon (Ne) gas. The luminescent substance is formed on the inner surface of the glass tube. The inner electrodes acting as a cathode and an anode are mounted on the both ends of the glass tube. The conductive contact leads are connected to the inner electrodes and extend out of the both ends of the glass tube to provide an electric field near the inner electrodes.

A related art power connection method for applying power to the CCFL is performed by soldering the contact lead of the CCFL to a wire directly, or by putting the CCFL on a socket housing and then making a socket retainer be in contact with the CCFL to fix the lead to a receptacle.

SUMMARY OF THE INVENTION

A related art power connection apparatus of a direct type backlight unit includes a socket housing and a socket retainer which are separated from each other, thus its assembly process is complicated, and the socket retainer is easily removed from its position. Contact is also unstable.

An object of the present invention is to provide a power connection apparatus of a direct type backlight unit, which substantially obviates one or more problems due to limitations and disadvantages of the related art. The power connection apparatus is configured to mount a lamp easily and come in contact with a lead of the lamp stably.

Additional advantages, objects, and features of the invention will be set forth in part in the description which follows and in part will become apparent to those having ordinary skill in the art upon examination of the following and/or may be learned from practice of the invention. The objectives and other advantages of the invention may be realized and attained by the structure particularly pointed out in the written description and claims hereof as well as the appended drawings.

To achieve these objects and other advantages, and in accordance with the purpose of the invention, as embodied and broadly described herein, there is provided a power connection apparatus of a direct type backlight unit for supplying power from an inverter to a lamp having a protruded lead, the power connection apparatus including: a base disposed on a substrate of the backlight unit; a lamp lead receiver having a space defined for receiving the lead by a pair of bent plate springs disposed on the base; a lamp lead guide disposed on the base for stably supporting the lead of the lamp; a lamp tube guide disposed on the base for stably supporting a tube of the lamp; an elastic cam spring applying an restoring force; and a pressure cam for pressing the lamp lead receiver using the restoring force of the cam spring.

In one embodiment, the lamp lead receiver includes a pair of plate springs that extend from the base and are bent at middle portions of the plate springs to make end portions of the plate springs be in contact with each other, wherein each of the plate springs includes a pressure plate spring in an outer portion thereof and a contact plate spring in an inner portion thereof, wherein the contact plate springs include a recess in each of the end portions to form a lead contact portion capable of contacting the lead of the lamp. The pressure cam is pressed by an external force to mount the lamp, the plate springs are released to incline the pressure plate springs at an angle $\theta 1$ and the contact plate springs at an angle $\theta 2$ so that the lead contact portion is opened, and when the external force is removed from the pressure cam after the lamp is mounted, the pressure cam is released to continuously press the pressure springs using the restoring force of the cam spring such that the pressure plate springs incline at an angle $\theta 1'$ less than the angle $\theta 1$, and the contact plate springs incline at an angle $\theta 2'$ less than the angle $\theta 2$, so that the lead contact portion comes in contact with the lead of the lamp. In addition, an angular variation ($\theta 1 - \theta 1'$) between the pressure plate springs is equal or greater than the angular variation ($\theta 2 - \theta 2'$) between the contact plate springs.

In another embodiment, when the pressure cam is released, the plate springs of the lamp lead receiver are also released so that the pressure plate springs and the contact plate springs incline outward at predetermined angles to make the lead contact portion be opened, and when the pressure cam is pressed by an external force, the pressure plate springs are compressed inward by the pressure cam, and after the pressure cam is disposed under the hooks, the external force is removed to release the pressure plate springs outward again so that the pressure cam is engaged with the hooks, and the pressure cam continuously presses the pressure plate springs using the restoring force of the cam spring so that the pressure plate springs and the contact plate springs are compressed to make the lead contact portion be in contact with the lead of the lamp.

In yet another embodiment, the lamp lead receiver includes a pair of plate springs that extend from the base and are bent outward at middle portions of the plate springs with a predetermined gap that is arranged to receive the lead of the lamp, wherein each of the plate springs includes a pressure plate spring in an outer portion thereof and a contact plate spring in an inner portion thereof, wherein the pressure plate springs include hooks for engaging with the pressure cam, and the contact plate springs include protrusions for holding the lead. When the pressure cam is released, the lead of the lamp is allowed to be inserted between the contact plate springs, and when the pressure cam is pressed by an external force, the pressure plate springs are compressed inward by the pressure cam, and after the pressure cam is disposed under the hooks, the external force is removed to release the pressure plate springs outward again so that the pressure cam is engaged with the hooks, and the pressure cam presses the pressure plate springs using the restoring force of the cam spring so that the pressure plate springs elastically deform, and gaps between the pressure plate springs and the contact plate springs are reduced to make the contact plate springs be in contact with the lead.

The cam spring is one of a "C" shaped bent plate spring extending upward from one end of the base, a multiple bent plate spring extending upward from the end of the base, and a plate spring joining a plate including the lamp tube guide. When the lamp is not mounted, the cam spring is released. After the lamp is mounted, when the pressure cam is engaged with the lamp lead receiver, the restoring force of the cam spring presses the lamp lead receiver through the pressure cam.

The pressure cam has a space allowing the pressure cam to be in contact with the lamp lead receiver. When an external force presses the pressure cam, the pressure cam is compressed downward to press the cam spring. When the external force is removed from the pressure cam, the restoring force of the cam spring presses the lamp lead receiver.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A typical direct type backlight unit includes a plurality of pairs of power connection apparatuses that are disposed at both ends of a plane. CCFLs are mounted to the pairs of power connection apparatuses, respectively. The direct type backlight unit operates using the power supplied from an inverter. Since power connection apparatuses of an embodiment are identical with each other, a representative power connection apparatus will now be described in the embodiment.

A First Embodiment

Figure 1:
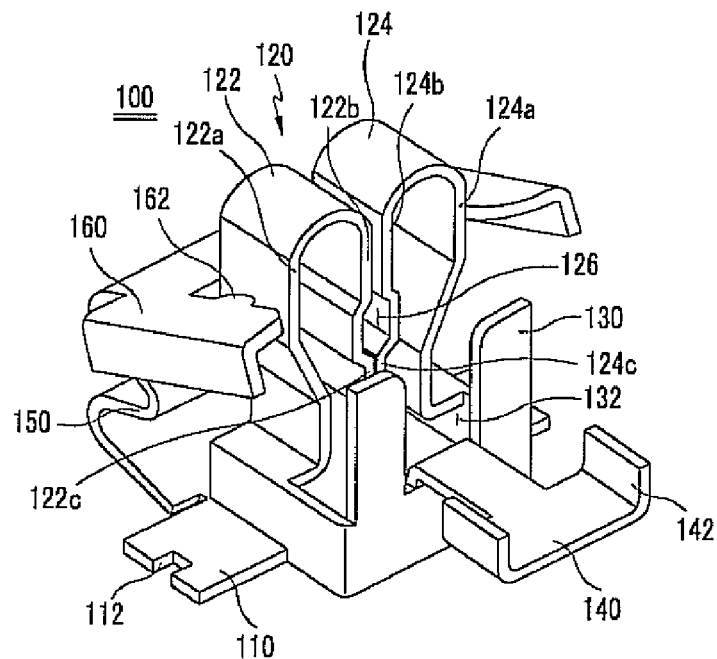
FIG. 1 is a perspective view illustrating a power connection apparatus according to a first embodiment of the present invention.
Figure 2:
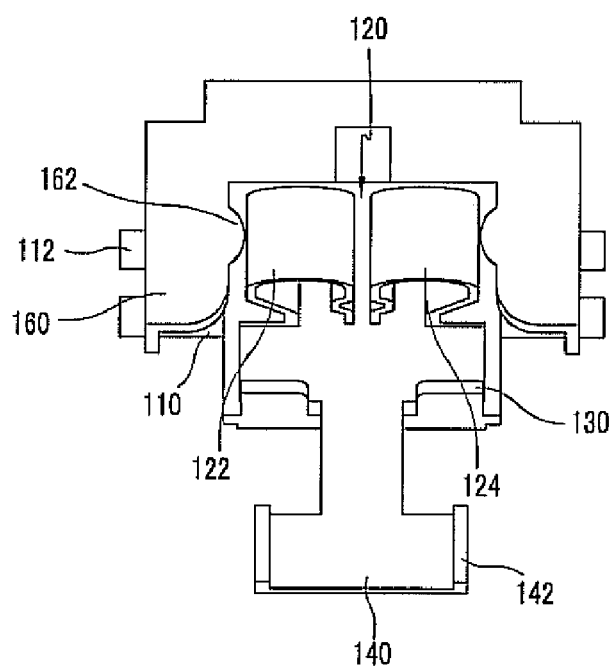
FIG. 2 is a plan view illustrating the power connection apparatus according to the first embodiment of the present invention.
Figure 3:
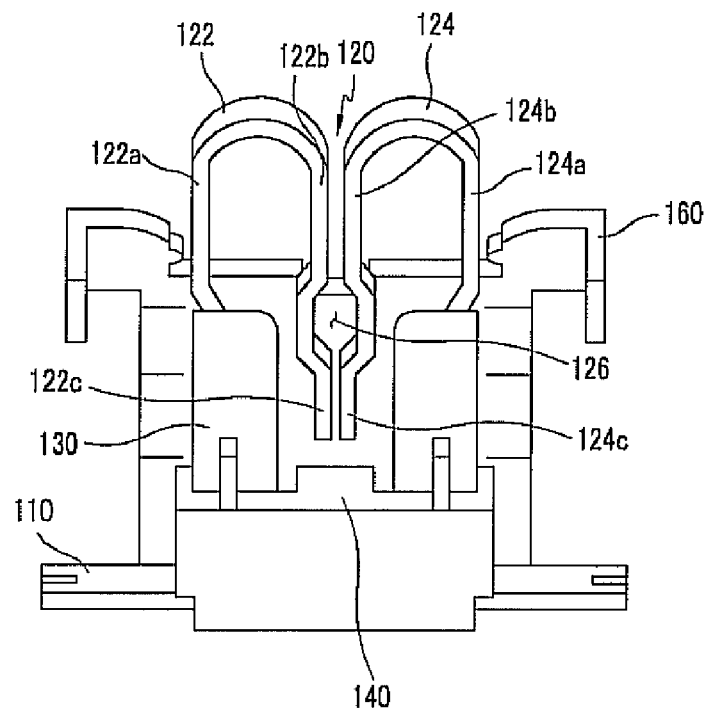
FIG. 3 is a rear view illustrating the power connection apparatus according to the first embodiment of the present invention.

FIG. 1 is a perspective view illustrating a power connection apparatus 100 according to a first embodiment of the present invention. FIG. 2 is a plan view illustrating the power connection apparatus 100 according to the first embodiment of the present invention. FIG. 3 is a rear view illustrating the power connection apparatus 100 according to the first embodiment of the present invention.

Referring to FIGS. 1 to 3, the power connection apparatus 100 includes a base 110, a lamp lead receiver 120, a lamp lead guide 130, a lamp tube guide 140, a cam spring 150, and a pressure cam 160. The power connection apparatus 100 is used to connect a lamp 10 of FIG. 4 to a direct type backlight unit.

The base 110 supports the power connection apparatus 100. Welding portions 112 are disposed at both ends of the base 110. The power connection apparatus 100 is fixed to a substrate (not shown) of the backlight unit by coupling the welding portions 112 to the substrate (not shown) of the backlight unit using a welding operation or a screw (not shown).

The lamp lead receiver 120 includes a pair of plate springs 122 and 124 that extend from the base 110 and are inwardly bent at middle portions in a reverse "U" shape to make end portions 122c and 124c be in contact with each other. The bent portions divide the lamp lead receiver 120 into outer portions and inner portions. The outer portions are referred to as pressure plate springs 122a and 124a. The inner portions are referred to as contact plate springs 122b and 124b. In a normal position, the pressure cam 160 presses and elastically deforms the pressure plate springs 122a and 124a to make the contact plate springs 122b and 124b be in contact with each other. A recess is formed in each of the end portions 122c and 124c to define a lead contact portion 126 that comes in contact with a lead 13 of FIG. 4.

The lamp lead guide 130 is a vertical wall upstanding from the base 110. An indentation 132 is disposed in the middle portion of the lamp lead guide 130 and allows only the lead 13 to pass therethrough to divide the lamp 10 into a lead portion and a tube portion.

The lamp tube guide 140 is a horizontal plate with guide walls 142 bent. The lamp tube guide 140 extends from the indentation 132 toward the lamp 10. A tube 11 of the lamp 10 is placed on the lamp tube guide 140. The guide walls 142 are disposed at both ends of the horizontal plate to prevent the lamp 10 from being moved.

The cam spring 150 is a double bent plate spring joining the base 110. In the normal position, the cam spring 150 applies a restoring force to the pressure cam 160 to press the plate springs 122 and 124.

The pressure cam 160 diagonally extends from the cam spring 150 and surrounds the lamp lead receiver 120 such that the elastic force of the cam spring 150 is applied to press the lamp lead receiver 120.

Figure 4:
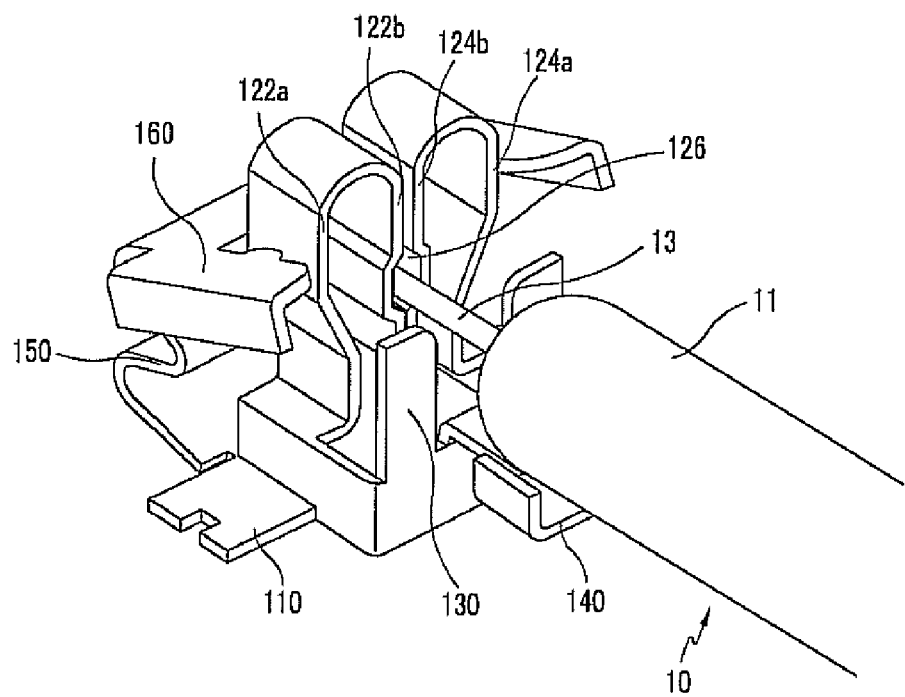
FIG. 4 is a perspective view illustrating a lamp mounted to the power connection apparatus according to the first embodiment of the present invention.

A process will now be described for mounting the lamp 10 to the power connection apparatus 100. When the pressure cam 160 is pressed, the plate springs 122 and 124 are released. The lamp 10 is then placed on the lamp lead guide 130 and the lamp tube guide 140 with the lead contact portion 126 opened. After that, the pressure cam 160 is released to press the plate springs 122 and 124 such that the lead 13 comes in contact with the lead contact portion 126 as illustrated in FIG. 4.

Figure 5:
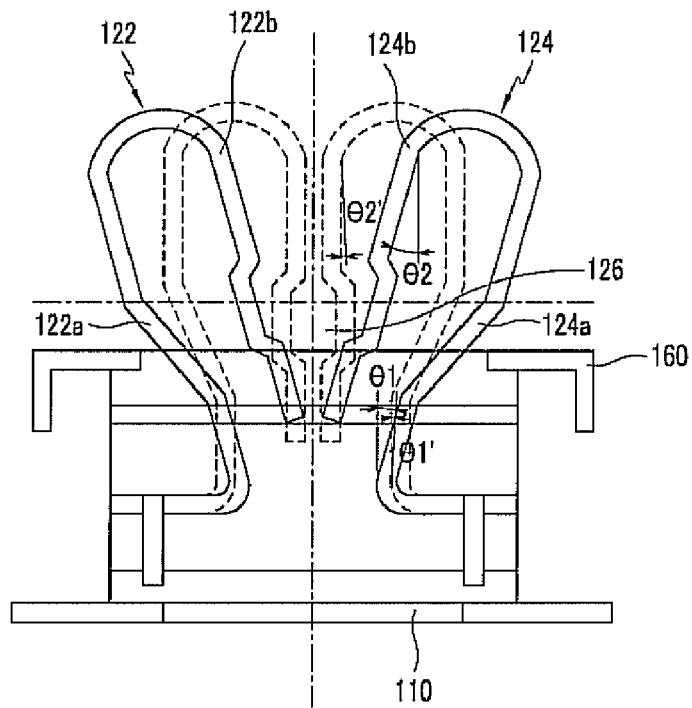
FIG. 5 is a rear view illustrating an operation of a lamp lead receiver according to the first embodiment of the present invention.

FIG. 5 is a view illustrating an operation of the pressure cam 160 and the lamp lead receiver 120 when the lamp 10 is mounted to the power connection apparatus 100. Referring to FIG. 5, solid lines represent the lamp lead receiver 120 that has been released by the compressed cam spring 150, and dotted lines represent the lamp lead receiver 120 that has been compressed by the restoring force of the released cam spring 150.

When the pressure cam 160 is pressed, the plate springs 122 and 124 are released to locate the pressure plate springs 122a and 124a at an angle θ1 and locate the contact plate springs 122b and 124b at an angle θ2. Thus, the lead contact portion 126 is opened wide. In here, the lamp 10 is placed on the lamp lead guide 130 and the lamp tube guide 140 such that the lead 13 is inserted into the lead contact portion 126.

Thereafter, when the pressure cam 160 is released, the restoring force of the cam spring 150 is applied to the pressure plate springs 122a and 124a through the pressure cam 160, thereby locating the pressure plate springs 122a and 124a at an angle $θ_{1'}$ and locating the contact plate springs 122b and 124b at an angle $θ_{2'}$. Thus, the lead contact portion 126 is compressed to come in contact with the lead 13.

When an angular variation $θ_1$-$θ_{1'}$ between the pressure plate springs 122a and 124a is compared with an angular variation $θ_2$-$θ_{2'}$ between the contact plate springs 122b and 124b, the angular variation $θ_1$-$θ_{1'}$ is equal or greater than the angular variation $θ_2$-$θ_{2'}$, and thus the contact plate springs 122b and 124b are in contact with the lead 13 in proportion to the difference between the angular variations $θ_1$-$θ_{1'}$ and $θ_2$-$θ_{2'}$.

The restoring force of the cam spring 150 must be greater than those of the pressure plate springs 122a and 124a such that the pressure cam 160 moves back towards its original position when the pressure cam 160 is released. To this end, the cam spring 150 is double bent, and a protrusion 162 of the pressure cam 160 makes point contact with the pressure plate springs 122a and 124a when the restoring force of the cam spring 150 is applied to the pressure plate springs 122a and 124a.

Figure 6:
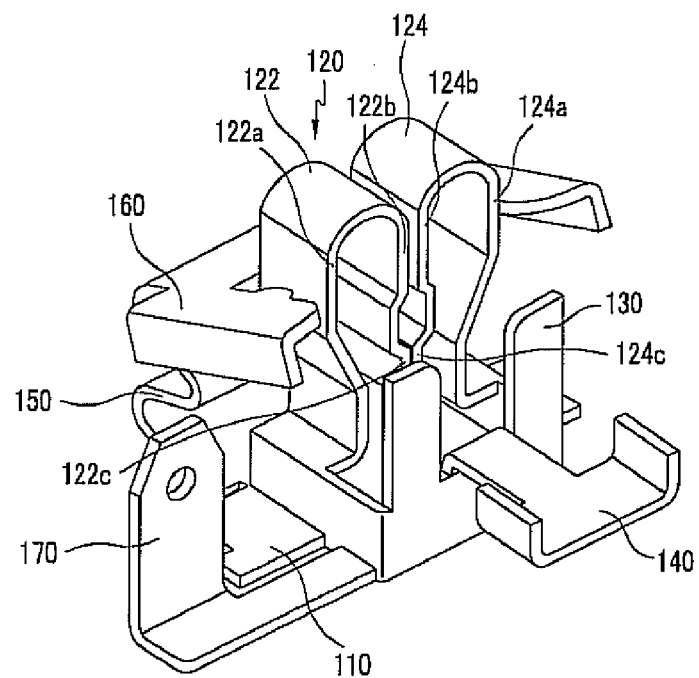
FIG. 6 is a view illustrating a power connection apparatus with a tab extending upward according to an embodiment of the present invention.
Figure 7:
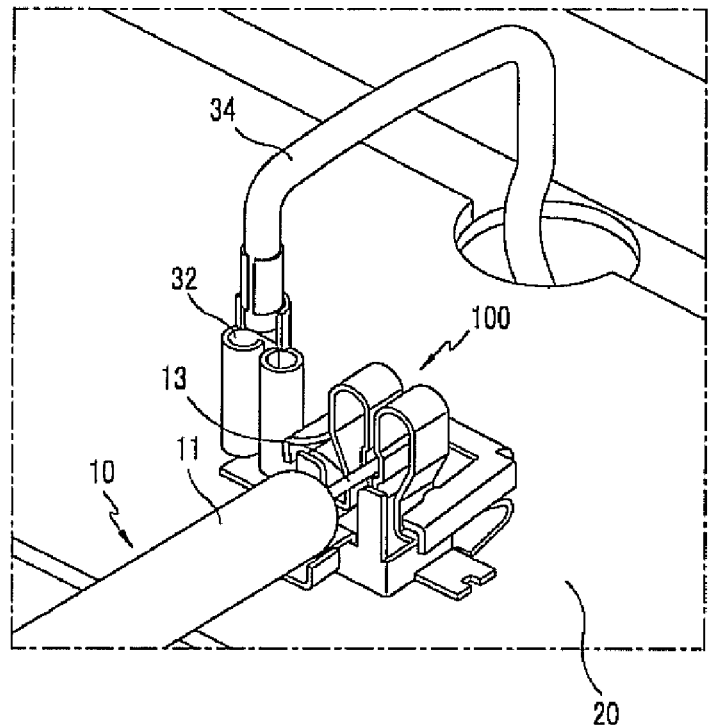
FIG. 7 is a view illustrating a wire connected to the tab of FIG. 6, according to an embodiment of the present invention.

FIG. 6 is a view illustrating a tab added to the power connection apparatus 100, according to an embodiment of the present invention. FIG. 7 is a view illustrating a power connection wire 34 connected to the tab of FIG. 6, according to an embodiment of the present invention.

In the case where the power connection apparatus 100 without the tab is mounted to the direct type backlight unit, the welding portions 112 are directly welded to a substrate 20 of the back light unit, and then the power of an inverter is connected to the substrate 20 so that the power is applied to power connection apparatuses together.

However, in the case of the power connection apparatus with the tab disposed on the base 110 illustrated in FIG. 6, one end of the power connection wire 34 is coupled to a receptacle 32, and the other end of the power connection wire 34 is connected to the inverter, so that the power is separately applied to each of the power connection apparatuses as illustrated in FIG. 7.

A Second Embodiment

Figure 8:
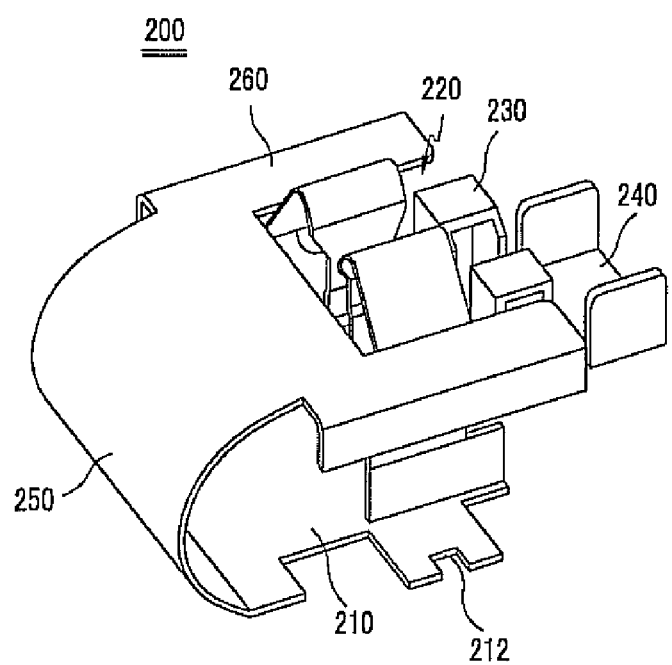
FIG. 8 is a front perspective view illustrating a power connection apparatus according to a second embodiment of the present invention.
Figure 9:
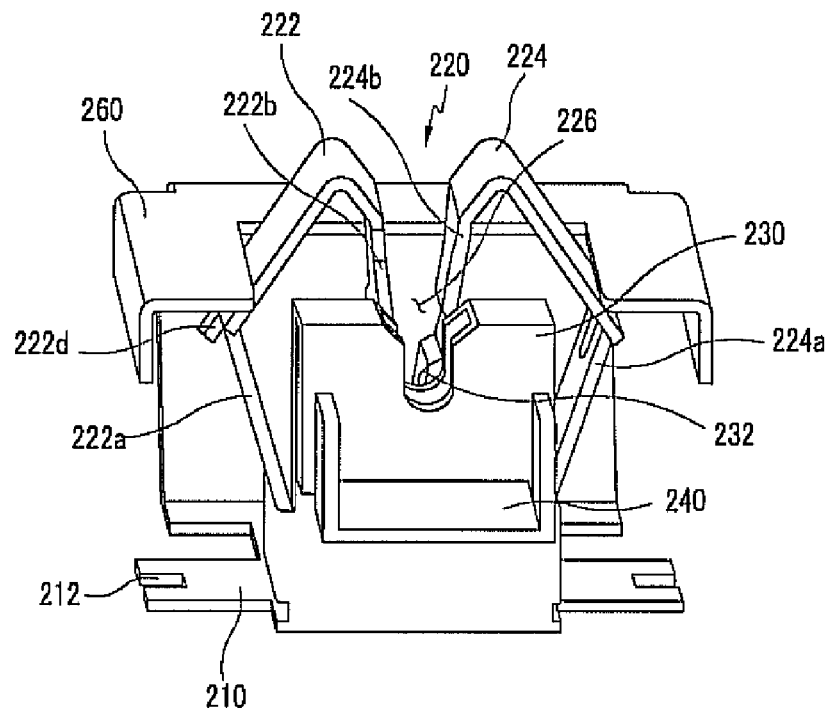
FIG. 9 is a rear perspective view illustrating the power connection apparatus according to the second embodiment of the present invention.
Figure 10:
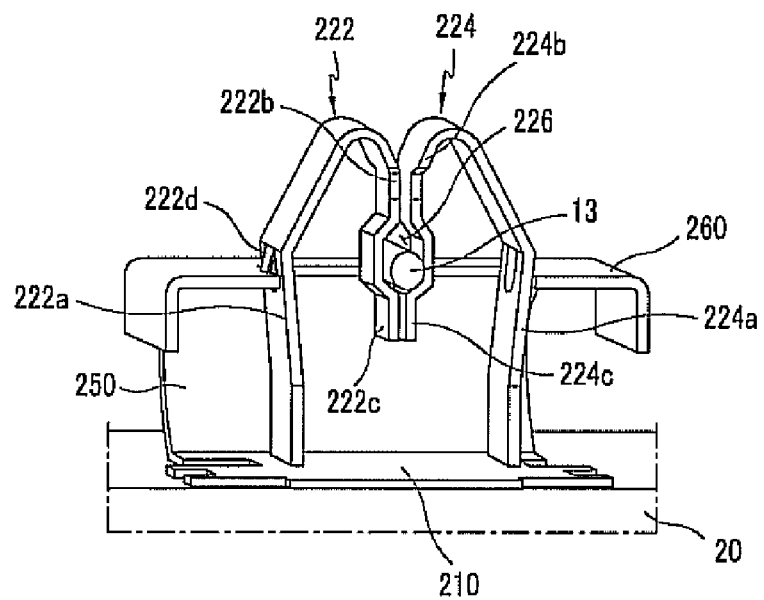
FIG. 10 is a view illustrating a lamp lead receiver according to the second embodiment of the present invention.
Figure 11:
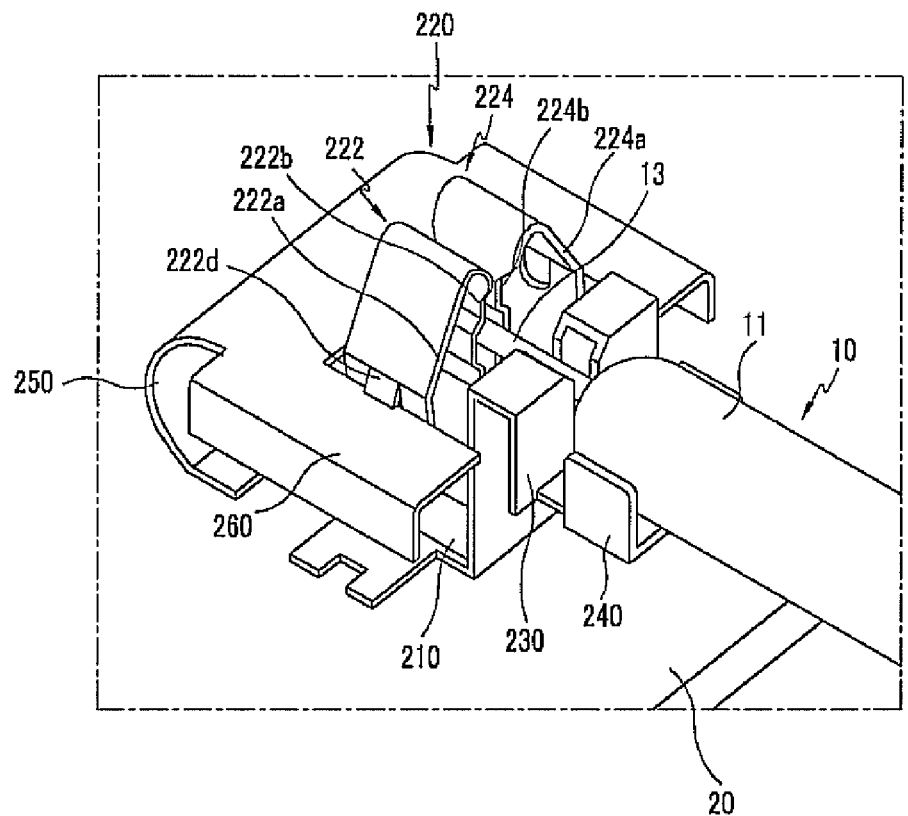
FIG. 11 is a view illustrating a pressure cam coupled with hooks according to the second embodiment of the present invention.

FIG. 8 is a front perspective view illustrating a power connection apparatus 200 of a back light unit according to a second embodiment of the present invention. FIG. 9 is a rear perspective view illustrating the power connection apparatus 200 according to the second embodiment of the present invention. FIG. 10 is a view illustrating a lamp lead receiver 220 according to the second embodiment of the present invention.

Referring to FIGS. 8 to 10, the power connection apparatus 200 includes a base 210, the lamp lead receiver 220, a lamp lead guide 230, a lamp tube guide 240, a cam spring 250, and a pressure cam 260.

The base 210 supports the power connection apparatus 200. Welding portions 212 are disposed at both ends of the base 210. The power connection apparatus 200 is fixed to a substrate (not shown) of the backlight unit by coupling the welding portions 212 to the substrate (not shown) of the backlight unit using a welding operation or a screw (not shown).

The lamp lead receiver 220 includes a pair of plate springs 222 and 224 that are inwardly bent at middle portions in a reverse "V" shape to make end portions 222c and 224c be in contact with each other. The bent portions divide the lamp lead receiver 220 into outer portions and inner portions. The outer portions are referred to as pressure plate springs 222a and 224a. The inner portions are referred to as contact plate springs 222b and 224b. A recess is formed in each of the end portions 222c and 224c to define a lead contact portion 226 that comes in contact with a lead 13 of FIG. 10. Hooks 222d and 224d protruding from the pressure plate springs 222a and 224a are engaged with the pressure cam 260. When the pressure cam 260 is pressed, the pressure plate springs 222a and 224a are inwardly compressed. After that, when the pressure cam 260 is further pressed to be located under the hooks 222d and 224d, the pressure plate springs 222a and 224a move back toward their original positions so that the pressure cam 260 is engaged with the hooks 222d and 224d.

The lamp lead guide 230 coupled to the base 210 guides the lead 13. The lamp tube guide 240 coupled to the base 210 supports a tube 11 of the lamp 10 stably. The lamp lead guide 230 is integrally formed with the lamp tube guide 240. Although the shapes of the lamp lead guide 230 and the lamp tube guide 240 are different from those of the first embodiment, the functions are identical. Furthermore, various modifications and variations can be made in the present invention.

The cam spring 250 joining the base 210 is released while the lamp 10 is not mounted. In the case where the lamp 10 is mounted and then the pressure cam 260 is pressed to engage with the hooks 222d and 224d of the lamp lead receiver 220, the cam spring 250 applies a restoring force to the pressure cam 260 to press the plate springs 222 and 224.

When the pressure cam 260 is released, the plate springs 222 and 224 are also released to allow the lamp 10 to be mounted to the lamp lead guide 230 and the lamp tube guide 240. When the lamp 10 is mounted and then the pressure cam 260 is pressed to be engaged with the hooks 222d and 224d of the lamp lead receiver 220, the plate springs 222 and 224 are pressed by the restoring force of the cam spring 250 such that the lead 13 comes in contact with the lead contact portion 226.

A process will now be described for mounting the lamp 10 to the power connection apparatus 200. When the pressure cam 260 is released, the pressure plate springs 222a and 224a are also released, and the lead contact portion 226 is opened. The lamp 10 is then placed on the lamp lead guide 230 and the lamp tube guide 240 such that the lead 13 is inserted into the lead contact portion 126.

Thereafter, the pressure cam 260 is pressed to be engaged with the hooks 222d and 224d, thereby continuously applying the restoring force of the cam spring 250 to the pressure plate springs 222a and 224a through the pressure cam 260. Thus, the lead 13 comes in contact with the lead contact portion 226 so that power is applied to an inner electrode.

In a second embodiment, the restoring force of the cam spring 250 is applied to the pressure plate springs 222a and 224a through the pressure cam 260 such that the lead 13 comes in contact with the lead contact portion 226, which is substantially the same as that described in the first embodiment. However, it is different from that described in the first embodiment in that the press cam 260 is released and the pressure plate springs 222a and 224a are also released so that the lamp 10 is mounted, and then the pressure cam 260 is pressed to be engaged with the hooks 222d and 224d, thereby continuously applying the restoring force of the cam spring 250 to the pressure plate springs 222a and 224a through the pressure cam 260 so as to make the lead 13 be in contact with the lead contact portion 226.

In other words, in the first embodiment, the pressure cam 160 must be pressed to release the lamp lead receiver 120 in order to mount the lamp 10. However, in the second embodiment, the lamp lead receiver 220 is released without any external force applied to the pressure cam 260, and the pressure cam 260 is pressed to be engaged with the hooks 222d and 224d after the lamp 10 is mounted.

Since the lamp lead receiver 220 is released without any external force applied to the pressure cam 260, a lamp-mounting operation of the second embodiment is more convenient than that of the first embodiment. In the first embodiment, since the pressure cam 160 must be pressed to mount the lamp 10, the application of an external force and the mounting of the lamp 10 are performed simultaneously.

Figure 12:
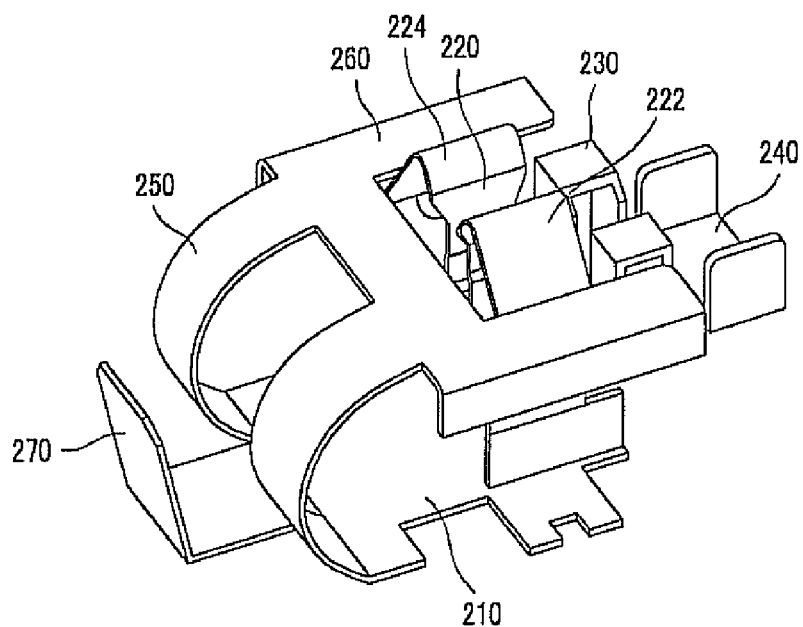
FIG. 12 is a view illustrating a power connection apparatus with a tab extending upward according to another embodiment of the present invention.
Figure 13:
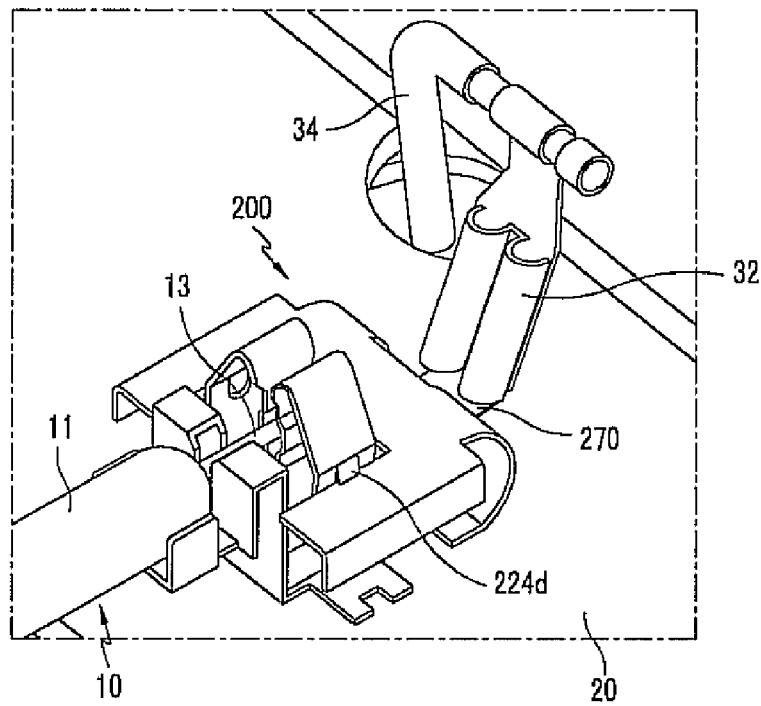
FIG. 13 is a view illustrating a wire connected to the tab of FIG. 12, according to an embodiment of the present invention.

FIG. 12 is a view illustrating a tab added to the power connection apparatus 200, according to an embodiment of the present invention. FIG. 13 is a view illustrating a power connection wire 34 connected to the tab of FIG. 12, according to an embodiment of the present invention.

In the case where the power connection apparatus 200 without the tab is mounted to the direct type backlight unit, the welding portions 212 are directly welded to a substrate 20 of the back light unit, and then the power of an inverter is connected to the substrate 20 so that the power is applied to power connection apparatuses together.

However, in the case of the power connection apparatus with the tab disposed on the base 110 illustrated in FIG. 12, one end of the power connection wire 34 is coupled to a receptacle 32, and the other end of the power connection wire 34 is connected to the inverter, so that the power is separately applied to each of the power connection apparatuses as illustrated in FIG. 13.

A Third Embodiment

Figure 14:
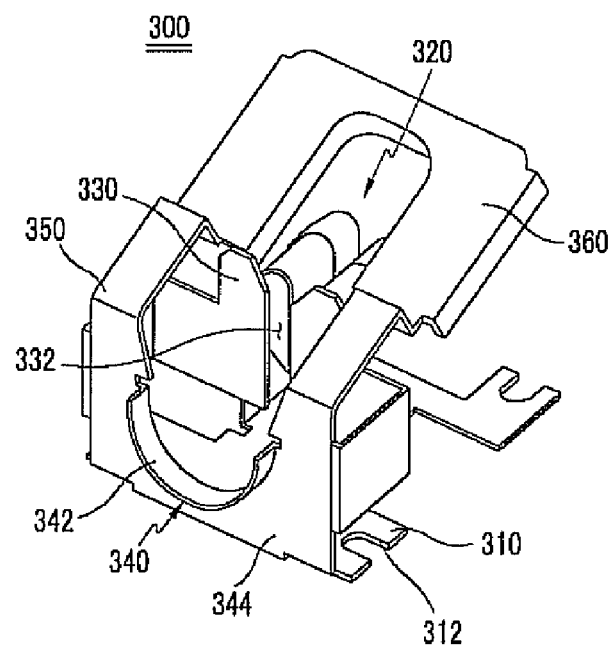
FIG. 14 is a perspective view illustrating a power connection apparatus according to a third embodiment of the present invention.
Figure 15:
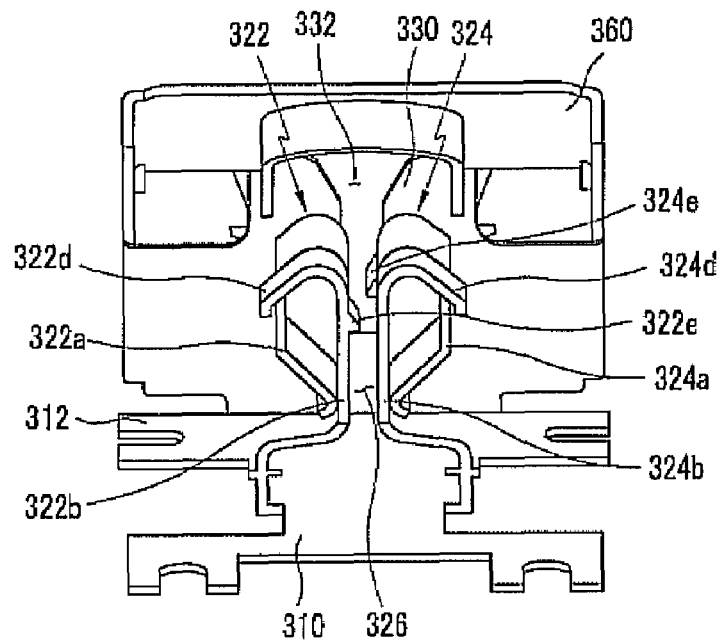
FIG. 15 is a rear view illustrating the power connection apparatus according to the third embodiment of the present invention.
Figure 16:
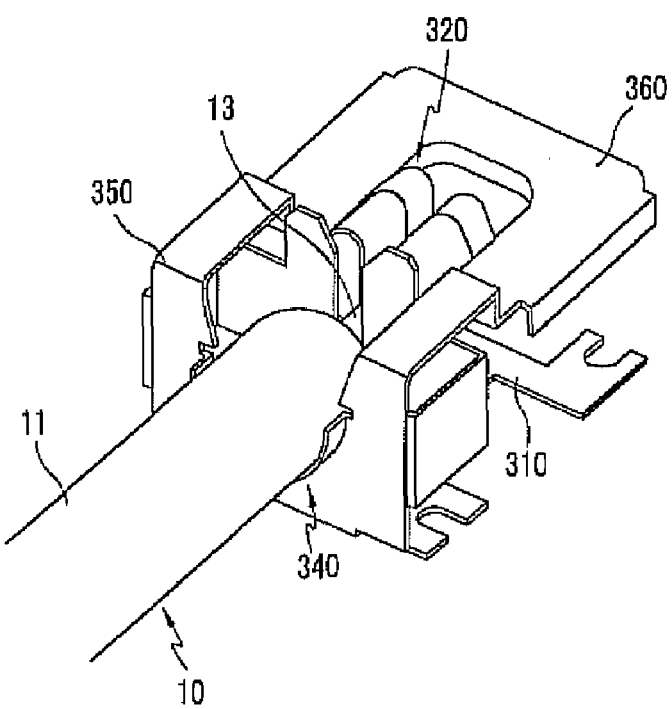
FIG. 16 is a perspective view illustrating a lamp mounted to the power connection apparatus according to the third embodiment of the present invention.

FIG. 14 is a perspective view illustrating a power connection apparatus 300 according to a third embodiment of the present invention. FIG. 15 is a rear view illustrating the power connection apparatus 300 according to the third embodiment of the present invention. FIG. 16 is a perspective view illustrating a lamp 10 mounted to the power connection apparatus 300 according to the third embodiment of the present invention.

Referring to FIGS. 14 to 16, the power connection apparatus 300 includes a base 310, a lamp lead receiver 320, a lamp lead guide 330, a lamp tube guide 340, a cam spring 350, and a pressure cam 360. The power connection apparatus 300 is used to connect the lamp 10 to a direct type backlight unit.

The base 310 supports the power connection apparatus 300. Welding portions 312 are disposed at both ends of the base 310. The power connection apparatus 300 is fixed to a substrate (not shown) of the backlight unit by coupling the welding portions 312 to the substrate (not shown) of the backlight unit using a welding operation or a screw (not shown).

The lamp lead receiver 320 includes a pair of plate springs 322 and 324 that extend from the base 310 and are outwardly bent at middle portions in a reverse "U" shape with a predetermined gap that is arranged to receive a lead 13. The bent portions divide the lamp lead receiver 320 into outer portions and inner portions. The outer portions are referred to as pressure plate springs 322a and 324a. The inner portions are referred to as contact plate springs 322b and 324b. Hooks 322d and 324d disposed on the pressure plate springs 322a and 324a are engaged with the pressure cam 360. Protrusions 322e and 324e disposed on the contact plate springs 322b and 324b are arranged to hold the lead 13. Particularly, the bent portions of the plate springs 322 and 324 divide into two parts to form the hooks 322d and 324d. The hooks 322d and 324d are disposed in the outer portions of the plate springs 322 and 324 near a lamp mounting position, and the protrusions 322e and 324e are alternately disposed. The pressure plate springs 322a and 324a are released in a normal position. When the pressure plate springs 322a and 324a are coupled with the pressure cam 360, the pressure plate springs 322a and 324a are elastically deformed by an restoring force of the cam spring 350, and thus a gap 326 between the contact plate springs 322b and 324b is reduced to make the contact plate springs 322b and 324b be in contact with the lead 13.

The lamp lead guide 330 is a vertical wall disposed on the base 310. An indentation 332 is disposed in the middle portion of the lamp lead guide 330 and allows only the lead 13 to pass therethrough to divide the lamp 10 into a lead portion and a tube portion.

The lamp tube guide 340 is a plate upstanding from the base 310. A half circle hole is formed in the lamp tube guide 340 such that a tube 11 of the lamp 10 is placed on the lamp tube guide 340. The cam spring 350 is integrally formed on the upper side of the lamp tube guide 340.

The cam spring 350 connected to the lamp tube guide 340 is released when the lamp 10 is not mounted. When the lamp 10 is mounted and then the pressure cam 360 is coupled with the lamp lead receiver 320, the restoring force of the cam spring 350 is applied to the pressure cam 360 to press the plate spring 322 and 324.

The pressure cam 360 diagonally extends from the cam spring 350 and surrounds the lamp lead receiver 320 such that the restoring force of the cam spring 350 is applied to press the lamp lead receiver 320. That is, when the pressure cam 360 is released, the plate springs 322 and 324 are also released to allow the lamp 10 to be mounted to the lamp lead guide 330 and the lamp tube guide 340. When the lamp 10 is mounted and then the pressure cam 360 is coupled with the lamp lead receiver 320, the restoring force of the cam spring 350 is applied to the pressure cam 360 to press the plate springs 322 and 324, thereby making the contact plate springs 322b and 324b be in contact with the lead 13.

A process will now be described for mounting the lamp 10 to the power connection apparatus 300. In the normal position, the pressure plate springs 322a and 324a are released, and the gap 326 between the contact plate springs 322b and 324b is opened. The lamp 10 is then placed on the lamp lead guide 330 and the lamp tube guide 340 such that the lead 13 is inserted into the gap 326. When the lead 13 is placed on its mounting position, the lead 13 is inserted between the protrusions 322e and 324e disposed on the contact plate springs 322b and 324b. The protrusions 322e and 324e prevents the mounted lead 10 from being released.

Thereafter, the pressure cam 360 is pressed to be coupled with the hooks 322d, 324d of the pressure plate springs 322a and 324a, thereby continuously applying the restoring force of the cam spring 350 to the pressure plate springs 322a and 324a through the pressure cam 360 so as to reduce the gap 326 between the contact plate springs 322b and 324b. Thus, the lead 13 comes in contact with the contact plate springs 322b and 324b so that power is applied to the lead 13 of the lamp 10.

Figure 17:
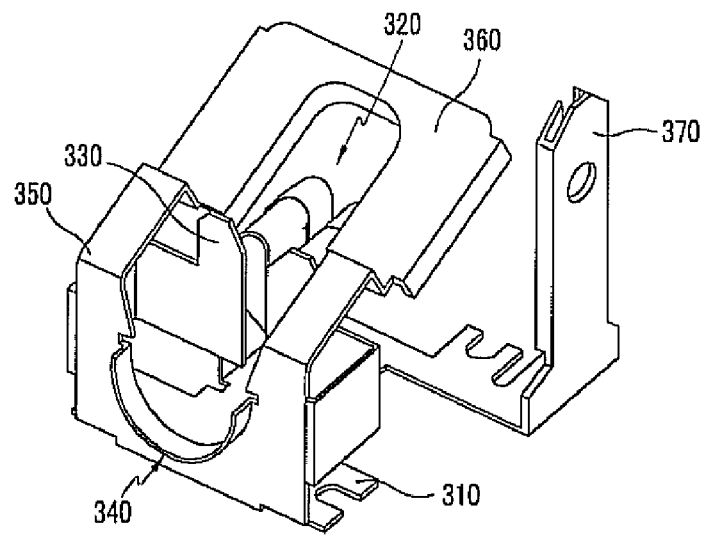
FIG. 17 is a view illustrating a power connection apparatus with a tab extending upward according to another embodiment of the present invention.
Figure 18:
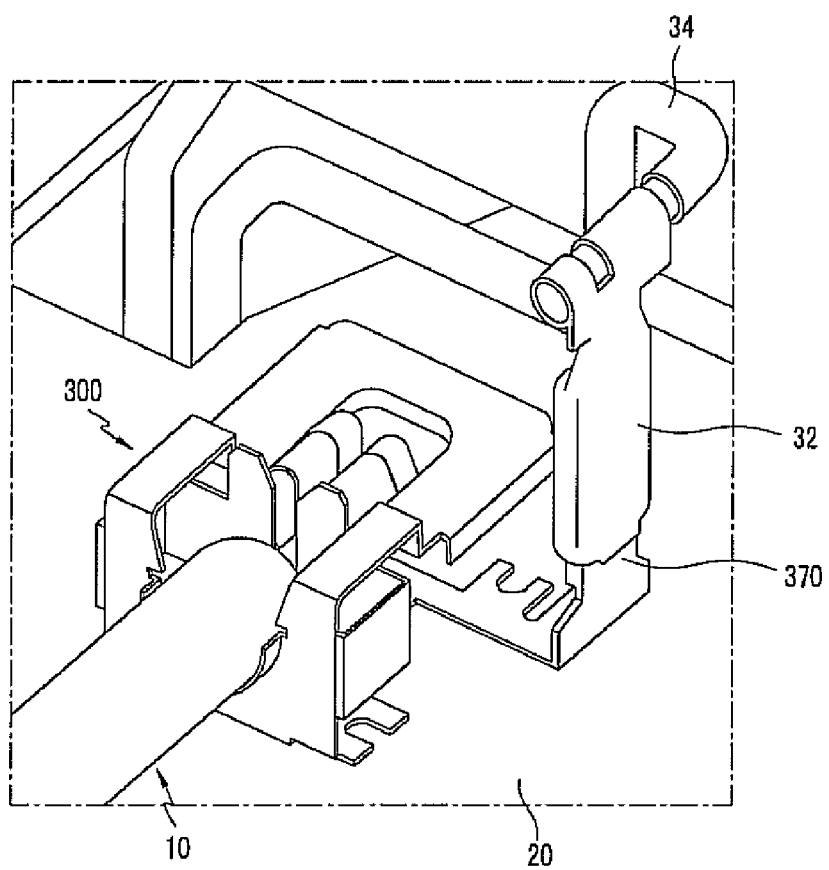
FIG. 18 is a view illustrating a wire connected to the tab of FIG. 17, according to an embodiment of the present invention.

FIG. 17 is a view illustrating a tab 370 extending upward from the power connection apparatus 300, according to an embodiment of the present invention. FIG. 18 is a view illustrating a power connection wire 34 connected to the tab 370 of FIG. 17, according to an embodiment of the present invention.

In the case where the power connection apparatus 300 without a tab is mounted to the direct type backlight unit, the welding portions 312 are directly welded to a substrate 20 of the backlight unit, and then the power of an inverter is connected to the substrate 20 so that the power is applied to power connection apparatuses together.

However, in the case of the power connection apparatus with the tab 370 extending upward from the base 310, as illustrated in FIG. 17, one end of the power connection wire 34 is coupled to a receptacle 32, and the other end of the power connection wire 34 is connected to the inverter, so that the power is separately applied to the power connection apparatuses as illustrated in FIG. 18.

Figure 19:
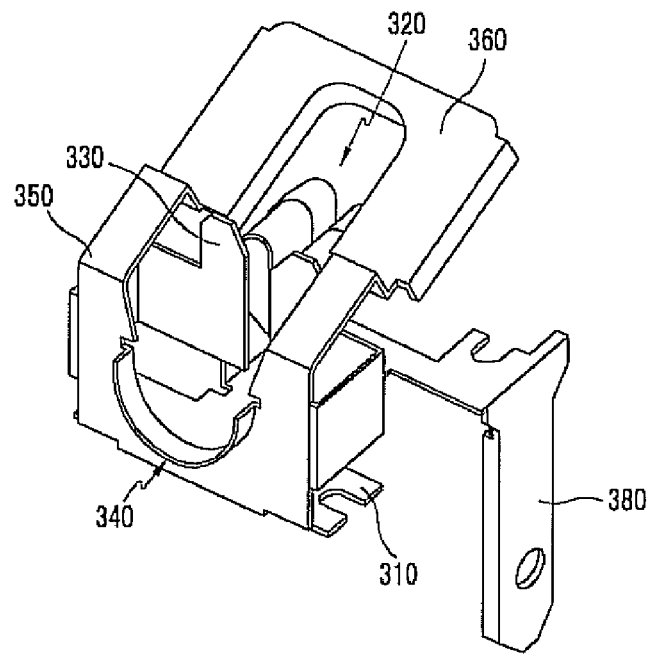
FIG. 19 is a view illustrating a power connection apparatus with a tab extending downward according to an embodiment of the present invention.
Figure 20:
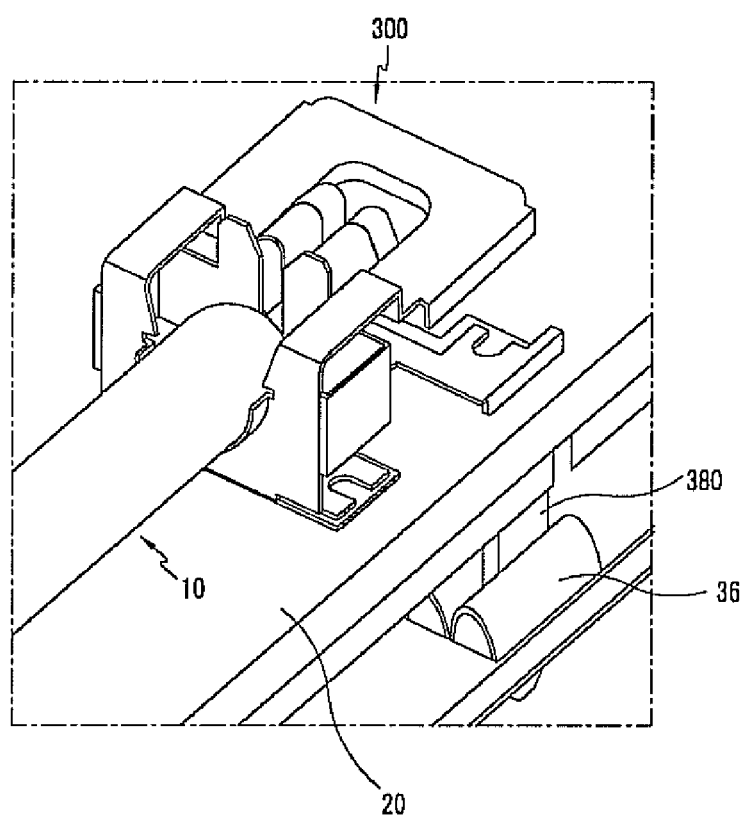
FIG. 20 is a view illustrating a connection through the tab of FIG. 19, according to an embodiment of the present invention.

FIG. 19 is a view illustrating a tab 380 extending downward from the power connection apparatus 300, according to an embodiment of the present invention. FIG. 20 is a view illustrating a connection through to the tab 380 of FIG. 19, according to an embodiment of the present invention.

In the case of the power connection apparatus with the tab 370 extending upward from the base 310, as illustrated in FIG. 17, one end of the power connection wire 34 is coupled to the receptacle 32, and the other end of the power connection cable 34 is connected to the inverter, so that the power is separately applied to the power connection apparatuses as illustrated in FIG. 18.

However, in the case of the power connection apparatus with the tab 380 extending downward from the base 310, as illustrated in FIG. 20, the tab 380 is directly inserted into a power connector 36. The power connection apparatus with the tab 380 is directly connected to the power connector 36 without using a power connection wire or a receptacle, thereby reducing the cost of a wire-forming process and making the power connection apparatus more compact in structure.

A Fourth Embodiment

Figure 21:
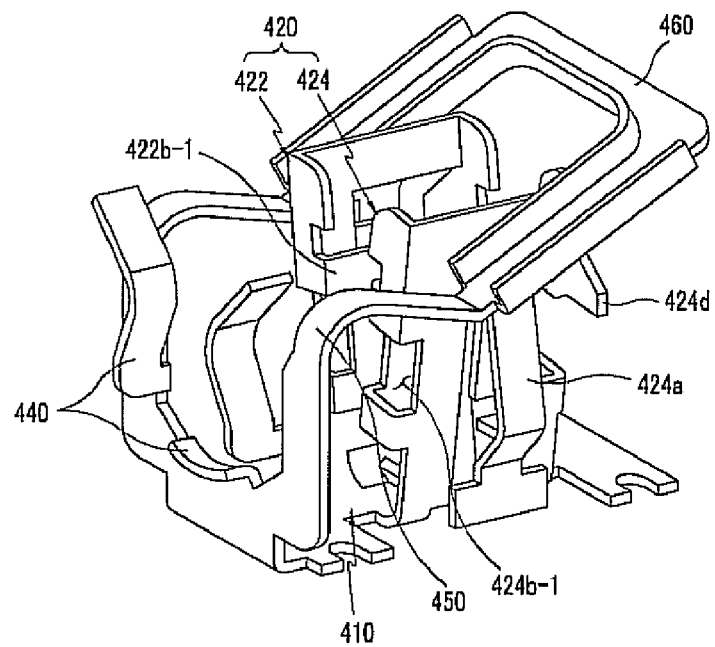
FIG. 21 is a front perspective view illustrating a power connection apparatus according to a fourth embodiment of the present invention.
Figure 22:
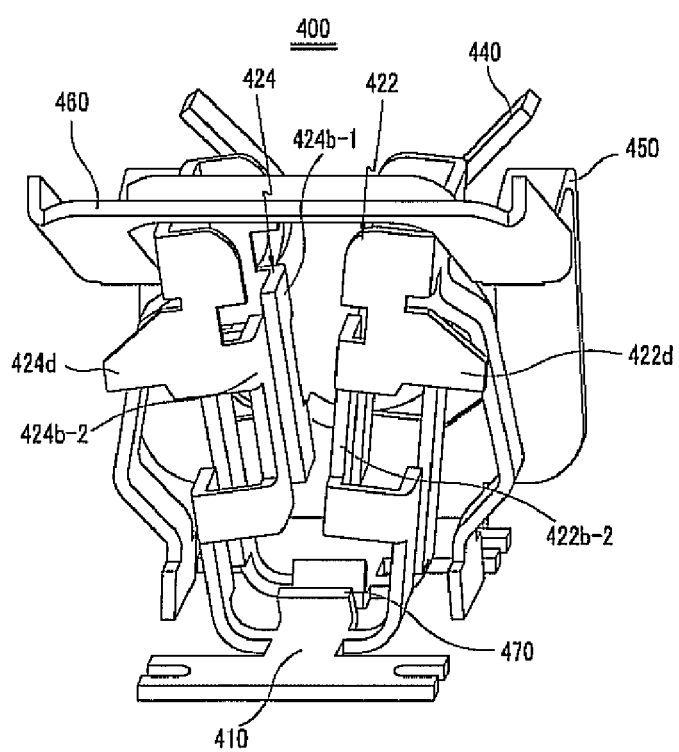
FIG. 22 is a rear perspective view illustrating the power connection apparatus according to the fourth embodiment of the present invention.
Figure 23:
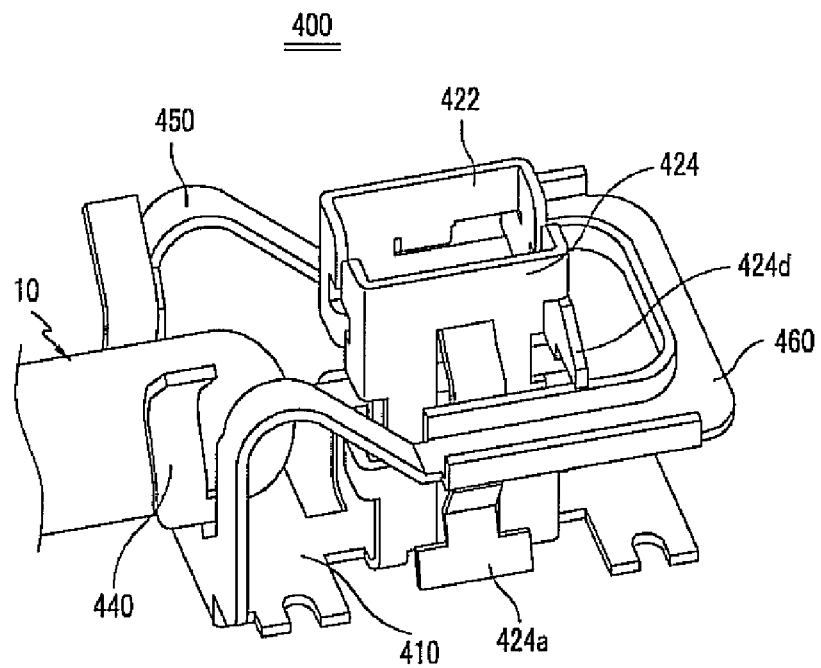
FIG. 23 is a perspective view illustrating a lamp mounted to the power connection apparatus according to the fourth embodiment of the present invention.

FIG. 21 is a front perspective view illustrating a power connection apparatus 400 according to a fourth embodiment of the present invention. FIG. 22 is a rear perspective view illustrating the power connection apparatus 400 according to the fourth embodiment of the present invention. FIG. 23 is a perspective view illustrating a lamp mounted to the power connection apparatus 400 according to the fourth embodiment of the present invention. FIGS. 24 to 27 are views illustrating an operation mechanism of the power connection apparatus 400 according to the fourth embodiment of the present invention.

Referring to FIGS. 21 to 23, the power connection apparatus 400 includes a base 410, a lamp lead receiver 420, a lamp tube guide 440, a cam spring 450, and a pressure cam 460.

The base 410 may include a tab contact portion 470 coming in contact with a tab for receiving electricity. The lamp lead receiver 420 includes a pair of plate springs 422 and 424 that extend vertically from the base 410 and face each other. Both ends of each of the plate springs 422 and 424 are bent to form a "[" shape. Facing surfaces of the "[" shaped ends are arranged to form contact plate springs 422b-1, 422b-2, 424b-1, and 424b-2 that come in contact with a lead 13 of a lamp 10. The plate springs 422 and 424 have opposite sides of the contact plate springs 422b-1, 422b-2, 424b-1, and 424b-2, respectively. The opposite sides extend outward to protrude in their middle portions, which are referred to as pressure plate springs 422a and 424a. Hooks 422d and 424d for engaging with the pressure cam 460 are disposed in upper portions of the plate springs 422 and 424, respectively. Thus, the lamp lead receiver 420 includes the two pressure plate springs 422a and 424a, the four contact plate springs 422b-1, 422b-2, 424b-1, and 424b-2, and the two hooks 422d and 424d.

The lamp tube guide 440 has a hole less than the diameter of the lamp 10 such that the lamp 10 is forced into the hole, thereby preventing the lamp from being released. The four contact plate springs 422b-1, 422b-2, 424b-1, and 424b-2 hold the lead 13 firmly without using the lamp lead guides 130, 230, and 330 described in the preceding embodiments.

The operation mechanism of the power connection apparatus 400 will now be described, in which the lamp 10 is mounted and then the pressure cam 460 is pressed to be engaged with the hooks 422d and 424d.

Figure 24:
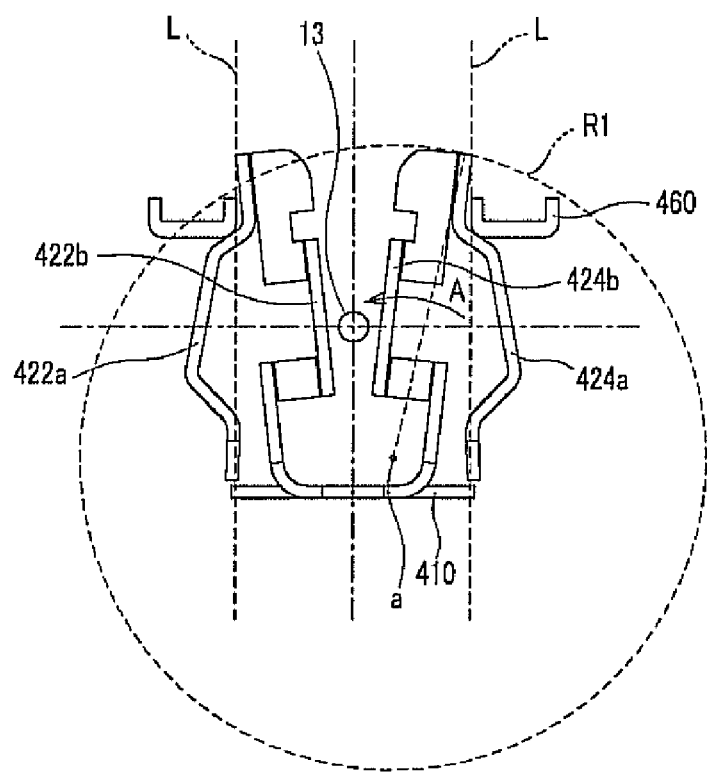
FIGS. 24 to 27 are views illustrating an exemplary operation mechanism of the power connection apparatus according to the fourth embodiment of the present invention.

Referring to FIG. 24, while the pressure cam 460 is pressed to be moved downward along its lines L of action, the pressure plate springs 422a and 424a are pressed to be moved toward the lead 13 by the pressure cam 460. The pressure plate spring 424a and the contact plate springs 424b-1 and 424b-2 moves around a rotation center "a" along a circle R1 of action in a direction of an arrow "A" until the pressure plate spring 424a come in contact with the lead 13. An operation of the plate spring 422 is the same as that of the plate spring 424 illustrated in FIGS. 24 to 27.

Figure 25:
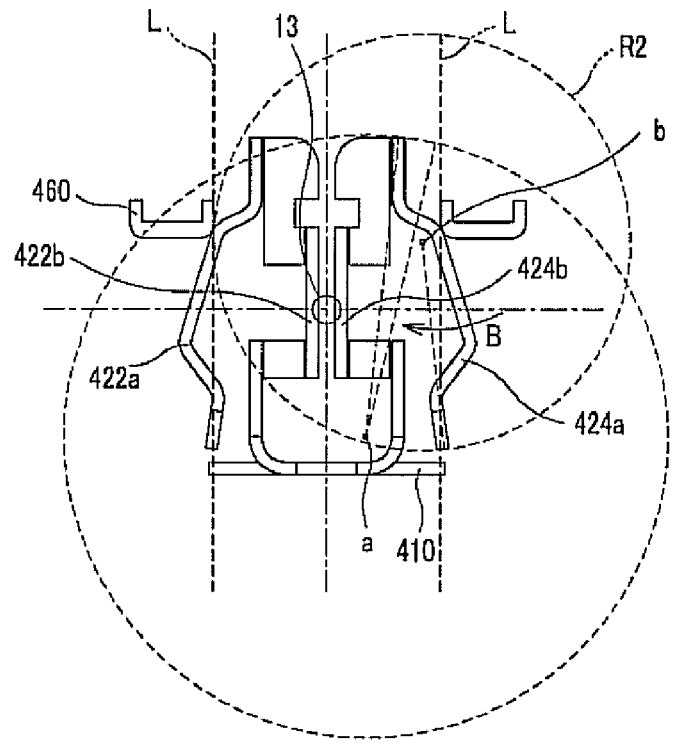

Referring to FIG. 25, when the contact plate springs 422b-1, 422b-2, 424b-1, and 424b-2 coming in contact with the lead 13 stop moving, the pressure cam 460 is further pressed such that the pressure plate spring 424a moves around a rotation center "b" along a circle R2 of action. Although the pressure plate spring 424a moves, the contact plate springs 424b-1 and 424b-2 are still stationary.

Figure 26:
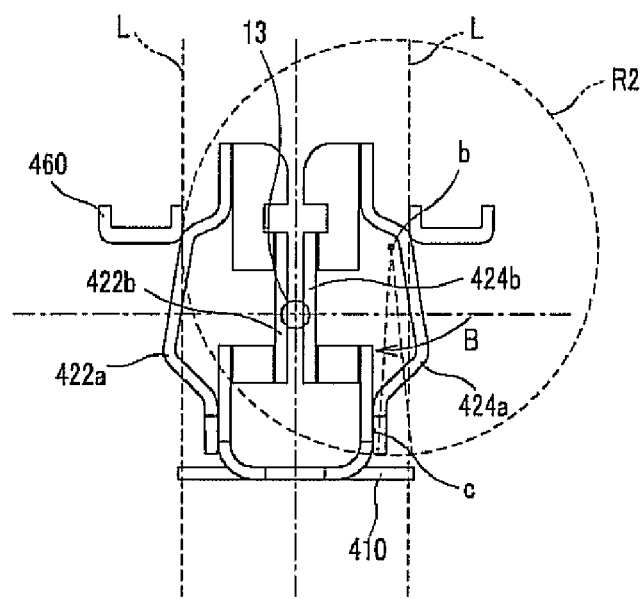
Figure 27:
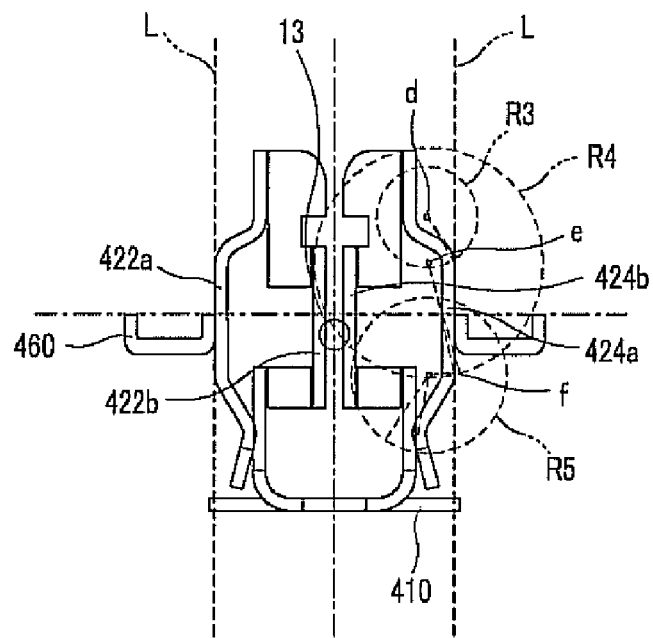

Thereafter, referring to FIG. 26, when the pressure plate spring 424a arrives at a contact area "c" disposed in a lower portion of the plate spring 424, the pressure plate spring 424a stops moving. Referring to FIG. 27, when the pressure cam 460 is further pressed, the pressure plate spring 424a is slid to be deformed around rotation centers d, e, and f along circles R3, R4, and R5 of action. As a result, the pressure plate spring 424a is vertically flat to apply its restoring force to the contact plate springs 424b-1 and 424b-2. Thus, the contact plate springs 422b-1, 422b-2, 424b-1, and 424b-2 and the lead 13 are pressed by the pressure cam 460 and the pressure plate springs 422a and 424a.

Figure 28:
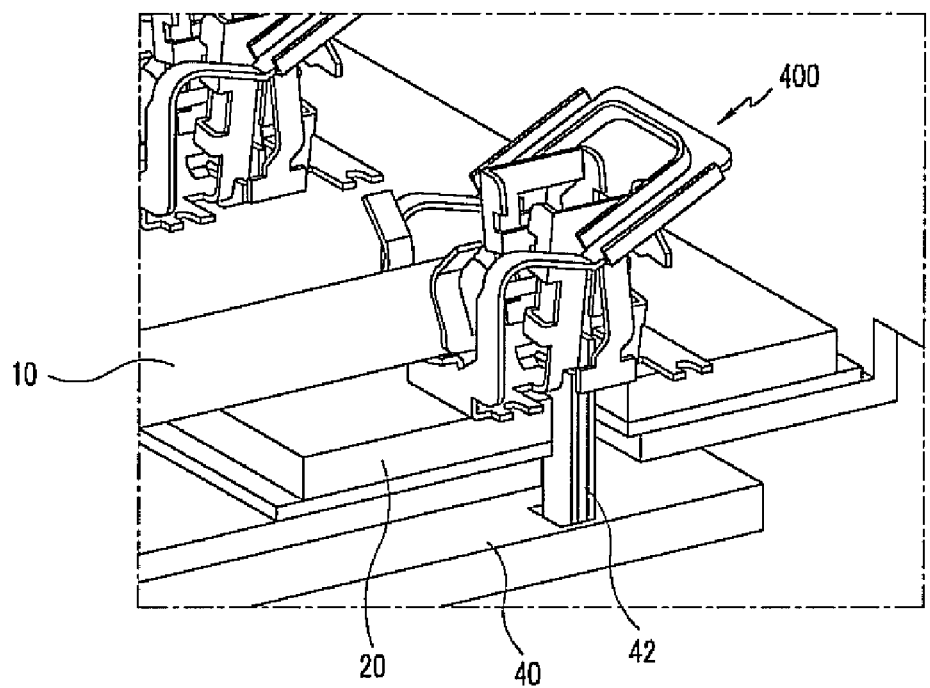
FIG. 28 is a view illustrating a tab contact portion for electrically connecting an inverter to the power connection apparatus according to the fourth embodiment of the present invention.
Figure 29:
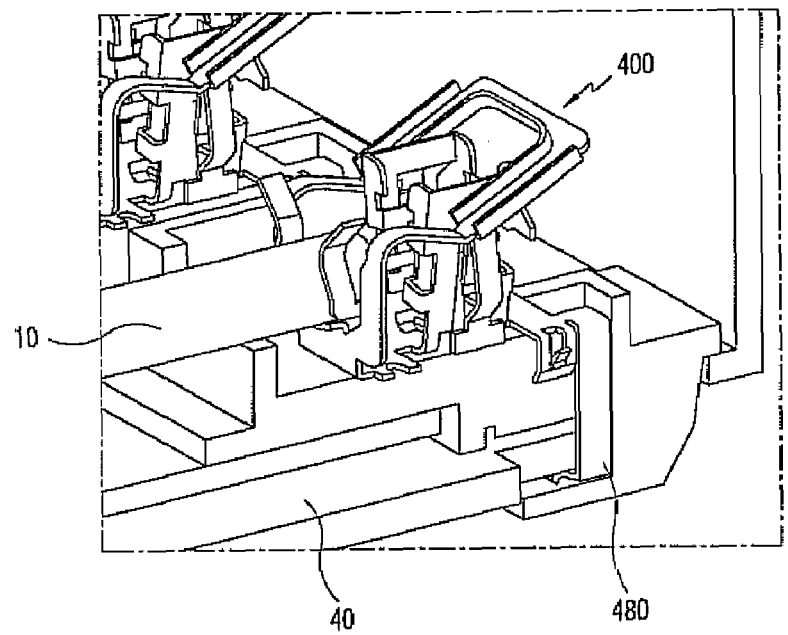
FIG. 29 is a view illustrating a pocket and an electric connection part for electrically connecting the inverter to the power connection apparatus according to the fourth embodiment of the present invention.

FIG. 28 is a view illustrating the tab contact portion 470 for electrically connecting an inverter 40 to the power connection apparatus 400 according to the fourth embodiment of the present invention. FIG. 29 is a view illustrating a pocket 50 and an electric connection part 480 electrically connecting an inverter 40 to the power connection apparatus 400 according to the fourth embodiment of the present invention.

Referring to FIG. 28, the power connection apparatus 400 may be connected to the inverter 40 by connecting the tab contact portion 470 disposed in the base 410 to a tab 42 of the inverter 40. Referring to FIG. 29, the electric connection part 480 may be coupled to a backlight unit by fitting the electric connection part 480 on the pocket 50 to be spaced a predetermined distance from each other, and then the inverter 40 may be slid to be fitted on the pocket 50. As a result, the electric connection part 480 is mechanically connected to the inverter 40 so that the power connection apparatus 400 is connected to the inverter 40.

A Fifth Embodiment

Figure 30:
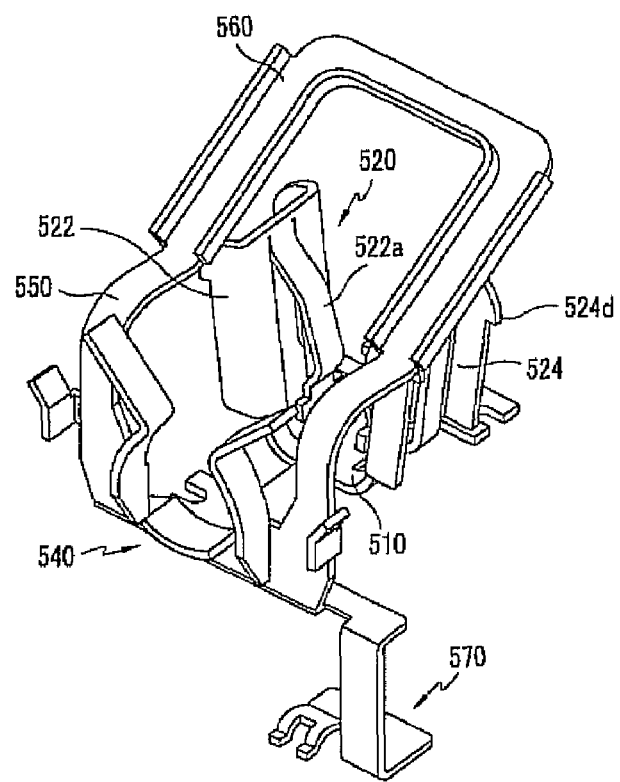
FIG. 30 is a front perspective view illustrating a power connection apparatus according to a fifth embodiment of the present invention.
Figure 31:
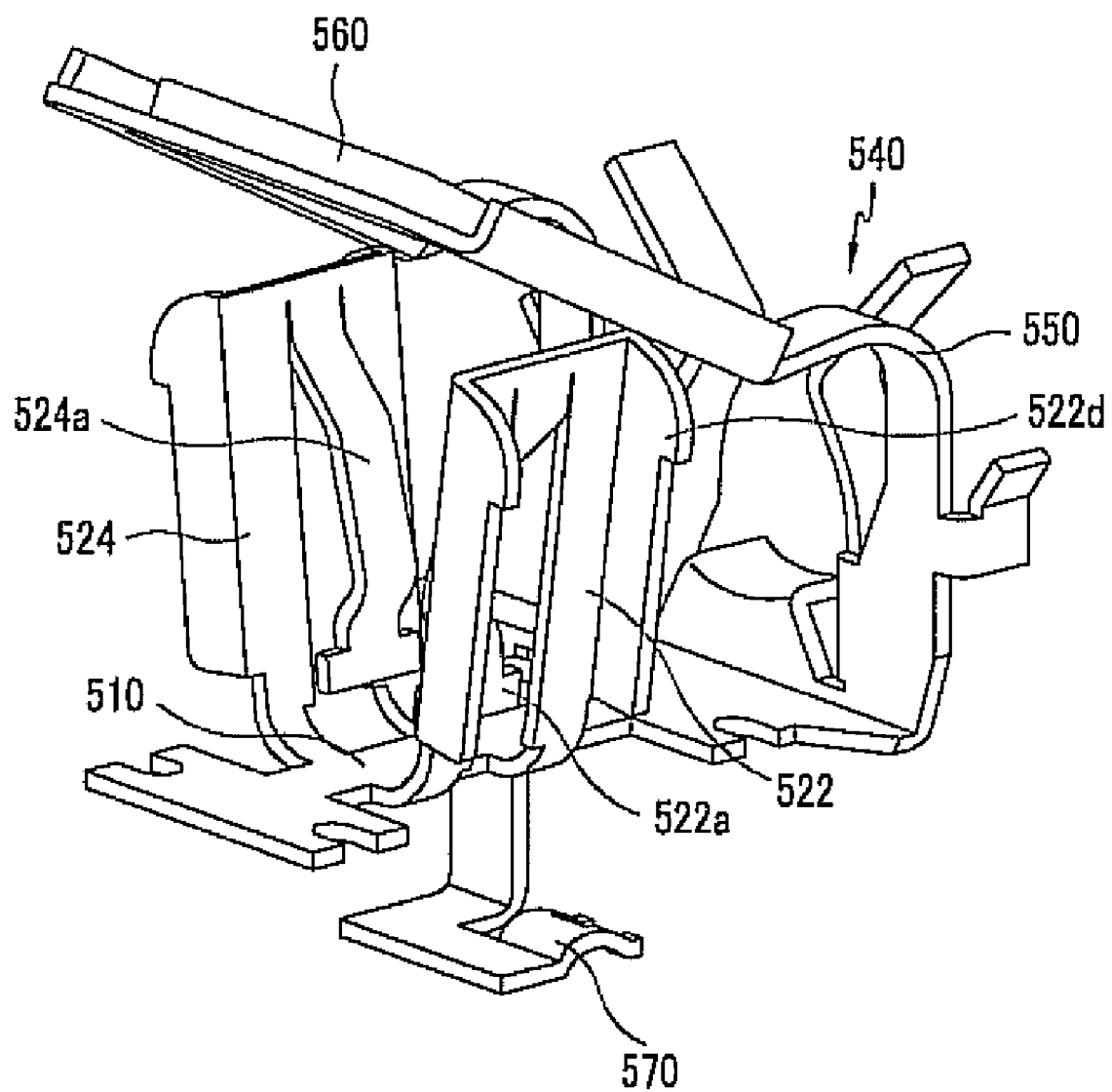
FIG. 31 is a rear perspective view illustrating the power connection apparatus according to the fifth embodiment of the present invention.

FIG. 30 is a front perspective view illustrating a power connection apparatus according to a fifth embodiment of the present invention. FIG. 31 is a rear perspective view illustrating the power connection apparatus according to the fifth embodiment of the present invention.

Referring to FIGS. 30 and 31, the power connection apparatus includes a base 510, a lamp lead receiver 520, a lamp tube guide 540, a cam spring 550, a pressure cam 560, and an inverter contact portion 570.

The inverter contact portion 570 joining the base 510 comes in contact with an inverter to receive electricity. The lamp lead receiver 520 includes a pair of plate springs 522 and 524 that extend from the base 510 and face each other. Middle portions of the plate springs 522 and 524 protrude inwardly to contact and press a lead of a lamp directly. The middle portions are referred to as contact-pressure plate springs 522a and 524a. Hooks 522d and 524d for engaging with the pressure cam 560 are disposed in outer portions of the plate springs 522 and 524, respectively. Thus, the lamp lead receiver 520, different from those of the first to fourth embodiments, includes the contact-pressure plate springs 522a and 524a that function as both a contact plate spring and a pressure plate spring.

Since the contact-pressure plate springs 522a and 524a protrude inwardly, the power connection apparatus having the contact-pressure plate springs 522a and 524a can be used in the case where a pitch of a lamp to be mounted is small. The inverter contact portion 570 is coupled to a backlight unit by fitting the inverter contact portion 570 on an insulated pocket to be spaced the pitch from each other, and then the inverter may be slid to be fitted on the pocket. As a result, the inverter contact portion 570 is mechanically connected to the inverter so that the power connection apparatus is connected to the inverter.

As described above, according to the embodiments of the present invention, the power connection apparatus is configured to supply power to an inner electrode of a CCFL without using a conductive wire and a socket including a terminal and a housing. Thus, the material costs of the power connection apparatus are reduced and the number of manufacturing processes is reduced to achieve automation, thereby reducing the manufacturing costs.

In addition, according to the embodiments of the present invention, the power connection apparatus is a single integration piece, and the restoring force of the cam spring makes the power connection apparatus be in mechanical contact with the lead of the lamp without a welding operation, thereby improving the electric contact performance between the lead of the lamp and the power connection apparatus. Also, the breakage of a welding portion caused by the movement of a conductive wire and the degradation of reliability of a plastic housing are prevented.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A power connection apparatus of a direct type backlight unit for supplying power from an inverter to a lamp having a protruded lead, the power connection apparatus comprising:
 a base disposed on a substrate of the backlight unit;
 a lamp lead receiver having a space defined for receiving the lead by a pair of bent plate springs disposed on the base;
 a lamp guide disposed on the base for stably supporting the lamp;
 an elastic cam spring applying a restoring force; and
 a pressure cam surrounding the lamp lead receiver and having a space to allow the pressure cam to be in contact with the lamp lead receiver,
 wherein the pressure cam deforms the cam spring when an external force is applied to the pressure cam, and the pressure cam presses the lamp lead receiver using the restoring force of the cam spring when the external force is removed.

2. The power connection apparatus of claim 1, wherein the lamp lead receiver comprises a pair of plate springs that extend from the base and are bent at middle portions of the plate springs to make end portions of the plate springs be in contact with each other,
 wherein each of the plate springs includes a pressure plate spring in an outer portion thereof and a contact plate spring in an inner portion thereof,
 wherein the contact plate springs include a recess in each of the end portions to form a lead contact portion capable of contacting the lead of the lamp.

3. The power connection apparatus of claim 2, wherein when the pressure cam is pressed by an external force to mount the lamp, the plate springs are released to incline the pressure plate springs at an angle $\theta_1$ and the contact plate springs at an angle $\theta_2$ so that the lead contact portion is opened, and
 when the external force is removed from the pressure cam after the lamp is mounted, the pressure cam is released to continuously press the pressure springs using the restoring force of the cam spring such that the pressure plate springs incline at an angle $\theta_{1'}$ less than the angle $\theta_1$, and the contact plate springs incline at an angle $\theta_{2'}$ less than the angle $\theta_2$, so that the lead contact portion comes in contact with the lead of the lamp.

4. The power connection apparatus of claim 3, wherein an angular variation ($\theta_1$-$\theta_{1'}$) between the pressure plate springs is equal or greater than the angular variation ($\theta_2$-$\theta_{2'}$) between the contact plate springs.

5. The power connection apparatus of claim 1, wherein the lamp lead receiver further comprises a pair of plate springs that extend from the base and are bent at middle portions of the plate springs to make end portions of the plate springs be in contact with each other,
 wherein each of the plate springs includes a pressure plate spring in an outer portion thereof and a contact plate spring in an inner portion thereof,
 wherein the contact plate springs include recesses to form a lead contact portion capable of contacting the lead of the lamp, and hooks for engaging with the pressure cam.

6. The power connection apparatus of claim 5, wherein when the pressure cam is released, the plate springs of the lamp lead receiver are also released so that the pressure plate springs and the contact plate springs incline outward at predetermined angles to make the lead contact portion be opened, and
 when the pressure cam is pressed by an external force, the pressure plate springs are compressed inward by the pressure cam, and after the pressure cam is disposed under the hooks, the external force is removed to release the pressure plate springs outward again so that the pressure cam is engaged with the hooks, and
 the pressure cam continuously presses the pressure plate springs using the restoring force of the cam spring so that the pressure plate springs and the contact plate springs are compressed to make the lead contact portion be in contact with the lead of the lamp.

7. The power connection apparatus of claim 1, wherein the cam spring is one of a "C" shaped bent plate spring extending upward from one end of the base and a multiple bent plate spring extending upward from the end of the base.

8. The power connection apparatus of claim 1, wherein the lamp lead receiver comprises a pair of plate springs that extend from the base and are bent outward at middle portions of the plate springs with a predetermined gap that is arranged to receive the lead of the lamp, and
 when the lamp is not mounted, the cam spring connected to a plate including a lamp tube guide is released, and when the pressure cam is coupled with the lamp lead receiver after the lamp is mounted, the restoring force of the cam spring is applied to the pressure cam to press the plate springs,
 wherein each of the plate springs includes a pressure plate spring in an outer portion thereof and a contact plate spring in an inner portion thereof,
 wherein the pressure plate springs include hooks for engaging with the pressure cam, and the contact plate springs include protrusions for holding the lead.

9. The power connection apparatus of claim 8, wherein when the pressure cam is released, the lead of the lamp is allowed to be inserted between the contact plate springs, and
 when the pressure cam is pressed by an external force, the pressure plate springs are compressed inward by the pressure cam, and after the pressure cam is disposed under the hooks, the external force is removed to release the pressure plate springs outward again so that the pressure cam is engaged with the hooks, and
 the pressure cam presses the pressure plate springs using the restoring force of the cam spring so that the pressure plate springs elastically deform, and gaps between the pressure plate springs and the contact plate springs are reduced to make the contact plate springs be in contact with the lead in proportion to variations of the gaps.

10. The power connection apparatus of claim 1, further comprising a tab extending upward from the base,
 wherein the tab is connected to a receptacle coupled to one end of a power connection wire with the other end connected to the inverter so that power is supplied to lamps, respectively.

11. The power connection apparatus of claim 1, further comprising a tab extending downward from the base,
 wherein the tab is directly connected to a power connector of the backlight unit so that power is supplied to lamps, respectively.

12. The power connection apparatus of claim 1, further comprising a tab contact portion capable of contacting a power tab of the backlight unit so that power is supplied to lamps, respectively.

13. The power connection apparatus of claim 1, wherein the lamp guide comprises:

a lamp tube guide provided to the base for stably supporting a tube of the lamp; and a lamp lead guide provided to the base for stably receiving the lead.

14. The power connection apparatus of claim 13, wherein the lamp tube guide has a hole less than a diameter of the lamp so that the lamp is forced into the hole to prevent the lamp from being released.

15. The power connection apparatus of claim 1, wherein the lamp lead receiver comprises a pair of plate springs that extend from the base, each of the plate springs including:

a pressure plate spring protruding outward from a middle portion of the plate spring;

a contact plate spring portion bent inward from both edge of the plate spring; and a hook bent outward from an end of the plate spring.

16. The power connection apparatus of claim 1, wherein the lamp lead receiver comprises a pair of plate springs that extend vertically from the base and face each other, each of the plate springs including:

contact plate springs bending from both ends of the plate spring and having a facing surface capable of contacting the lead of the lamp;

a pressure plate spring extending outward to protrude from a middle portion of an opposite side of the facing surface; and a hook disposed in an upper portion of the plate spring for engaging with the pressure cam.

17. The power connection apparatus of claim 1, wherein the lamp lead receiver comprises a pair of plate springs that extend from the base and face each other, each of the plate springs including:

a contact-pressure plate spring protruding inward from a middle portion of the plate spring for contacting and pressing the lead of the lamp; and hooks disposed in an outer portion of the plate spring for engaging with the pressure cam.

* * * * *